United States Patent [19]

Watt, Jr. et al.

[11] 4,045,361

[45] Aug. 30, 1977

[54] FABRIC CONDITIONING COMPOSITIONS

[75] Inventors: David M. Watt, Jr., Cincinnati; Joseph P. Nirschl, Fairfield, both of Ohio

[73] Assignee: The Procter & Gamble Company, Cincinnati, Ohio

[21] Appl. No.: 579,740

[22] Filed: May 21, 1975

[51] Int. Cl.[2] ........................ C09K 3/16; D06M 13/36; D06M 13/46

[52] U.S. Cl. ........................................ 252/8.8; 252/8.6; 252/8.9; 260/DIG. 19; 260/DIG. 20; 427/242

[58] Field of Search ........................... 252/8.8, 8.6, 8.9; 260/DIG. 19, DIG. 20; 427/242

[56] References Cited

U.S. PATENT DOCUMENTS

| | | | |
|---|---|---|---|
| 2,628,176 | 2/1953 | Simon et al. | 260/DIG. 20 |
| 3,904,533 | 9/1975 | Neidith et al. | 252/8.8 |
| 3,920,564 | 11/1975 | Grecsek | 252/8.8 |
| 3,920,565 | 11/1975 | Morton | 252/8.8 |
| 3,936,537 | 2/1976 | Baskerville et al. | 252/8.8 |
| 3,936,538 | 2/1976 | Marshall et al. | 252/8.8 |

*Primary Examiner*—Allan Lieberman
*Attorney, Agent, or Firm*—Ronald L. Hemingway; Richard C. Witte

[57] ABSTRACT

Aqueous liquid rinse-added fabric conditioning compositions comprising diamine static control agents, quaternary ammonium fabric softeners and, optionally, particulate sorbitan ester material provide fabric softening and exceptional fabric static control.

11 Claims, No Drawings

FABRIC CONDITIONING COMPOSITIONS

BACKGROUND OF THE INVENTION

This invention relates to compositions and methods for conditioning fabrics during home laundering operations. More specifically, this invention relates to compositions and methods that are employed during the laundry rinse cycle in order to improve the tactile properties of laundered fabrics. The compositions produce minimal fabric staining and can be prepared in highly stable form.

Rinse-cycle fabric conditioning is widely used. Such rinse-cycle fabric conditioning imparts to laundered fabrics a texture or handle that is smooth, pliable and fluffy to the touch. Moreover, conditioning of fabrics in the deep rinse can also impart to laundered fabrics a reduced tendency to pick up and/or retain static charge. The former property of conditioned fabrics is generally called fabric "softness" and the latter property is generally called fabric "static control".

Widely used rinse-added fabric conditioning compositions are aqueous suspensions or emulsions comprising major amounts of water, lesser amounts of fabric conditioning compounds, and minor amounts of optional ingredients such as perfumes, dyes, preservatives and stabilizers. These aqueous compositions can be conveniently added to the rinse bath during the rinsing cycle of automatic laundry operations.

Many compounds have been disclosed as having the capacity to condition fabrics and, in particular, to soften fabrics. Typically representative of such compounds are those cation-active compounds appearing in column 2 of U.S. Pat. No. 3,756,950 issued Sept. 4, 1973 to Gluck and entitled "Fabric Softening Compositions". Moreover, certain diamine compounds have been disclosed as through-the-wash fabric softeners in British Pat. No. 1,356,827 published June 19, 1974; issued to Henkel & Cie GmbH. Further U.S. Pat. No. 3,879,300 issued Apr. 22, 1975 to Renold and entitled "Diamine Containing Softener Compositions" and U.S. Pat. No. 3,154,489 issued Oct. 27, 1964 to Du Brow et al. and entitled "Surface Active Compositions" disclose, respectively, diamine and ethoxylated diamines in certain fabric conditioning compositions.

Although these and many other fabric conditioning compounds are known, there is a continuing need for aqueous rinse-added compositions and methods which not only soften fabrics but which furthermore provide highly effective fabric static control. This need is especially apparent given the widespread use of synthetic fibers in textile fabrics and the tendency of these fibers to pick up and retain static charge.

Moreover, although a variety of aqueous liquid fabric conditioning compositions have been disclosed in the art, many of these liquid compositions do not have optimum physical stability over wide temperature ranges. Stability problems generally arise because of the solubility characteristics of the ingredients commonly used in such aqueous liquid fabric conditioning compositions. The ability of many compounds to provide rinse-added fabric conditioning is related to the rate of deposition of the compounds onto fabrics from the aqueous rinse baths. Consequently, it is usually desirable to employ fabric conditioning compounds which are relatively insoluble in water. This water-insolubility can provide equilibrium conditions highly favorable for deposition of the fabric conditioning compounds onto the fabrics from aqueous rinse baths.

However, this very water-insolubility of rinse-added fabric conditioning compounds makes for difficulty in incorporating them into physically stable and economical aqueous liquid rinse-added products. Often aqueous liquid fabric conditioning compositions require specialized mixing techniques using relatively expensive emulsifiers and/or solvents for optimized stability and performance. Even with these techniques, however, the stability of many prior art aqueous fabric conditioning compositions is not wholly satisfactory, especially when such compositions are subjected to extreme temperature variations. There is then a continuing need for stable liquid fabric conditioning compositions which provide exceptional fabric softening and static control.

Accordingly, it is an object of the present invention to provide compositions and methods for conditioning fabrics during the rinse cycle of laundering operations.

It is a further object of the invention herein to provide fabric conditioning compositions and methods that not only provide a desirable degree of fabric softening but that also provide exceptionally effective fabric static control.

It is a further object of the invention herein to provide aqueous fabric conditioning compositions of exceptional physical stability.

These and other objectives are realized by means of the present invention. Aqueous liquid compositions of the invention herein can be made in highly stable form. Remarkably, they even can be prepared as clear products and yet, when added to aqueous rinse baths, the clear products provide the highly favorable water/fabric equilibrium necessary for optimum fabric conditioning performance. Moreover, the clear compositions can be opacified for aesthetic appeal without any substantial loss in stability or performance. Alternatively, the compositions herein can be prepared as stable emulsions and/or suspensions.

SUMMARY OF THE INVENTION

The invention herein relates to aqueous liquid rinse-added fabric conditioning compositions which impart a high degree of fabric softening and very effective static control to laundered fabrics. Methods of using such compositions are also provided.

Broadly, the aqueous liquid rinse-added fabric conditioning compositions of the invention herein, comprise from about 0.5 to 50% by weight of a diamine static control agent; from about 0.5 to 20% by weight of a quaternary ammonium fabric softener and from about 50 to 98% by weight water.

The diamine static control agent has the general formula

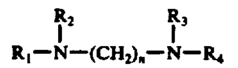

wherein *n* is 2 to 5; R is alkyl containing from 12 to 20 carbon atoms; and $R_2$, $R_3$ and $R_4$ are hydrogen or alkyl containing 1 to 20 carbon atoms, provided that at least two of $R_2$, $R_3$ and $R_4$ are hydrogen or alkyl containing from about 1 to 3 carbon atoms. The partially or fully acidified acid salts of such diamine compounds are also useful as are mixtures of unacidified diamine compounds and diamine acid salts. The fully acidified diamine acid salts should be water-soluble and have non-interfering anions.

The quaternary ammonium fabric softeners utilized herein have the general structure

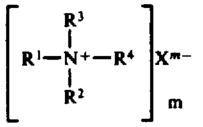

wherein $R^1$ is an alkyl group containing from about 12 to 20 carbon atoms; $R^2$ is selected from the group consisting of alkyl of about 1 to 20 carbon atoms, cycloalkyl of about 5 to 8 carbon atoms, carboxymethyl, aryl of 6 to 8 carbon atoms, alkaryl of 7 to 10 carbon atoms, pyridyl and groups of the general formula $$-(C_3H_6O)_a(C_2H_4O)_bH$$

wherein *a* and *b* are integers and $a+b$ is 1 to 50; $R^3$ and $R^4$ are each selected from the group consisting of alkyl of about 1 to 3 carbon atoms, cycloalkyl of about 5 to 8 carbon atoms, carboxymethyl, aryl of 6 to 8 carbon atoms, alkaryl of 7 to 10 carbon atoms, pyridyl and groups of the general formula $$-(C_3H_6O)_a(C_2H_4O)_bH$$

wherein *a* and *b* are integers and $a+b$ is 1 to 50; X is a non-interfering anion; and *m* is 1 when X is monovalent and *m* is 2 when X is divalent.

The instant compositions have a pH in the range of from about 3 to about 9.

The fabric conditioning compositions can optionally contain from about 0.1 to 20% by weight of particulate sorbitan ester material having an average particle size of from 5 to 150 microns.

In the method aspect of the invention herein, the above-described fabric conditioning compositions are added to the deep rinse stage of the laundering cycle. The diamine static control agents are employed in the rinse water at concentrations of from about 2 to about 500 ppm, preferably from about 10 to about 100 ppm. The quaternary ammonium fabric softeners are employed in the rinse water at concentrations of from about 2 to about 200 ppm. The particulate sorbitan ester material can be added to the rinse water to the extent of from about 1 to about 200 ppm.

DETAILED DESCRIPTION OF THE INVENTION

The invention herein relates to liquid rinse-added fabric conditioning compositions essentially containing (A) diamine static control agents, (B) quaternary ammonium fabric softeners and (C) water. The compositions can further contain optional components such as (1) particulate sorbitan esters, (2) opacifiers and (3) other conventional fabric conditioning composition adjuvants.

Essential Components

A. Diamine Static Control Agents

Essentially present in the fabric conditioning compositions herein are certain diamine static control agents. These diamine static control agents comprise by weight from about 0.5 to about 50%, preferably from about 1 to about 10% of the compositions.

The diamine static control agents are selected from the group consisting of particular diamine compounds, certain acid salts of these diamine compounds and mixtures of the diamine compounds and their acid salts.

Useful diamine compounds have the general formula:

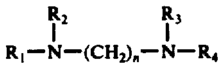

wherein $R_1$ is an alkyl group containing from about 12 to 20 carbon atoms; $R_2$, $R_3$ and $R_4$ are hydrogen or alkyl of from about 1 to 20 carbon atoms, provided that at least two of $R_2$, $R_3$ and $R_4$ are hydrogen or alkyl containing 1 to 3 carbon atoms; and *n* is from 2 to 5.

Nonlimiting examples of such diamine compounds include:

$C_{16}H_{33}-N(CH_3)-(CH_2)_3-N(CH_3)_2$ $C_{18}H_{37}-N(CH_3)-(CH_2)_2-N(C_2H_5)_2$ $C_{12}H_{25}-N(CH_3)-(CH_2)_3-HN-C_{12}H_{25}$ $C_{12}H_{25}-N(C_2H_5)-(CH_2)_3-N(C_3H_7)_2$ $R_{Tallow}-NH-(CH_2)_3-N(C_2H_5)_2$ $C_{20}H_{41}-N(CH_3)-(CH_2)_2-N(CH_3)_2$ $C_{15}H_{31}-N(C_2H_5)-(CH_2)_3-NH_2$ $C_{18}H_{37}-NH-(CH_2)_3-HN-CH_3$ $C_{16}H_{33}-NH-(CH_2)_3-HN-C_{16}H_{33}$ $R_{Tallow}-N(CH_3)-(CH_2)_3-N(C_2H_5)_2$ $C_{16}H_{33}N(CH_3)-(CH_2)_5-N(C_2H_5)_2$ $C_{12}H_{25}N(C_2H_5)-(CH_2)_2-N(C_3H_7)_2$ and $C_{14}H_{29}N(CH_3)-(CH_2)_3-(CH_3)N-C_8H_{17}$ wherein in the above formulas $R_{Tallow}$ is the alkyl group derived from tallow fatty acid.

Other examples of suitable diamine compounds include N-tetradecyl, N'-propyl-1,3-propane-diamine; N-eicosyl,N,N', N'-triethyl-1,2-ethane-diamine and N-octadecyl,N,N',N'-tripropyl-1,3-propane-diamine.

The diamine static control agent of the instant compositions can, of course, comprise mixtures of diamine compounds of this type.

As noted, the acid salts of these diamine compounds are also useful static control agents in the compositions of the present invention. Acid salts of diamine compounds, as used herein, are the addition products formed when certain acids add to the amino moieties of the diamines and form mono-or di-ammonium salts.

The diamine acid salts can be partially acidified diamine salts (i.e., only one nitrogen quaternized with acid) or fully acidified diamine salts (i.e., both nitrogen quaternized with acid). When fully acidified, the diamine acid salts should be water-soluble. Suitable acid salts are water-soluble to the extent of at least about 1 gm/liter at 25° C, and more preferably at least about 5 gms/liter or more at 25° C. At these higher water solubilities, highly stable products can be prepared.

A variety of acids can provide such water solubility and can be used herein to form the acid salts so long as the anion of the diamine acid salt formed is stable under fabric rinse conditions and is non-interfering in the rinse. Suitable water-soluble acids include organic and inorganic acids such as hydrochloric acid, acetic acid, sulfuric acid, sulfonic acid, formic acid, citric acid and a large variety of others. Particularly preferred acids used to form diamine acid salts include acetic acid and hydrochloric acid.

The form in which the diamine acid salt is derived is not critical. The diamine acid salt can be formed from diamines in situ during the preparation of the aqueous fabric conditioning compositions herein or can alternatively, for example, be obtained as the acid salt from commercial sources (e.g. Duomac®T marketed by Armak Co.). Mixtures of diamine acid salts can, of course, be used as the static control agent in the compositions of the present invention.

The acid salts of the diamine compounds are the preferred diamine static control agents. These diamine acid salts serve not only to provide high levels of static control, but, furthermore, serve to couple the hereinafter disclosed quaternary ammonium softeners with water. The fully acidified diamine salts (i.e., the diacid salts) are particularly preferred inasmuch as these materials permit formation of highly stable, clear, aqueous liquid fabric conditioning compositions. As noted, mixtures of unacidified diamine compounds and diamine acid salts are also useful as static control agents in the instant compositions.

Preferred aqueous fabric conditioning compositions contain diamine static control agents, whether acidified or not, wherein $R_1$ is alkyl of from about 16 to about 18 carbon atoms; and $R_2$, $R_3$ and $R_4$ are hydrogen or alkyl of from about 1 to about 2 carbon atoms and *n* is 2 or 3, more preferably 3.

Diamine compounds and acid salts useful in the invention herein are commercially available under a variety of trade names including Duomeens® and Duomacs® (marketed by Armak Co.) and Genamins® (marketed by Farbwecke Hoechst). Moreover, diamines can be prepared in accordance with processes disclosed in the art as, for example, in U.S. Pat. No. 2,267,205 issued Dec. 23, 1941 to Kyrides and U.S. Pat. No. 2,246,524 issued June 24, 1941 to Kyrides.

B. Quaternary Ammonium Fabric Softener

The second essential component in the aqueous liquid fabric conditioning compositions herein is a quaternary ammonium fabric softener. (As used herein, quaternary ammonium fabric softener refers to nitrogen compounds wherein a single nitrogen atom is covalently bonded to four hydrocarbyl or substituted-hydrocarbyl moieties and is to be distinguished from the acid salts of diamine compounds wherein the nitrogen atoms are covalently bonded to at most 3 hydrocarbyl or substituted-hydrocarbyl moieties.)

The quaternary ammonium fabric softener comprises from about 0.5 to 20% by weight of the instant compositions, preferably from about 0.5 to 8% by weight of the composition.

The quaternary ammonium fabric softeners useful herein are selected from the group consisting of compounds of the formula:

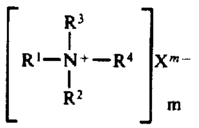

wherein $R^1$ is an alkyl group containing from about 12 to 20 carbon atoms, $R^2$ is selected from the group consisting of alkyl of about 1 to 20 carbon atoms, cycloalkyl of about 5 to 8 carbon atoms, carboxymethyl, aryl of 6 to 8 carbon atoms, alkaryl of 7 to 10 carbon atoms, pyridyl and a group of the general formula $$-(C_3H_6O)_a(C_2H_4O)_bH$$

wherein *a* and *b* are integers and $a+b$ is 1 to 50; $R^3$ and $R^4$ are each selected from the group consisting of alkyl of about 1 to 3 carbon atoms, cycloalkyl of about 5 to 8 carbon atoms, carboxymethyl, aryl of 6 to 8 carbon atoms, alkaryl of 7 to 10 carbon atoms, pyridyl and groups of the general formula $$-(C_3H_6O)_a(C_2H_4O)_aH$$

wherein *a* and *b* are integers and $a+b$ is 1 to 50; X is a non-interfering anion such as chloride, nitrate, fluoride, sulfate, methylsulfate, carbonate, hydrogen phosphate, dihydrogen phosphate, chlorate or hydroxide; and *m* is 1 when X is monovalent and *m* is 2 when X is divalent.

Examples of quaternary ammonium fabric softeners useful in the compositions herein include dioctadecyldimethylammonium chloride; ditetradecyldimethylammonium methylsulfate; dihexadecyldipropylammonium nitrate; ditallowdiethylammonium hydrogen phosphate;

$$[(C_{16}H_{33})_2N(CH_3)_2]_2SO_4;$$

diheptadecyldipropylammonium nitrate; tetradecyldimethylbenzylammonium chloride; octadecylhexadecyldimethylammonium chloride; dinonadecyldiethylammonium nitrate; eicosyltrimethylammonium chloride; dieicosyldiethylammonium methylsulfate; eicosyltripropylammonium nitrate; ditallowdimethylammonium chloride;

$$[(C_{16}H_{33})_2N(CH_3)_2]_2CO_3,$$

$[C_{20}H_{41}N(CH_3)_3]_2HPO_4$, the alkyl dimethyl ethylbenzyl ammonium chlorides of Petrocci et al., U.S. Pat. No. 3,525,793 issued Aug. 25, 1970; and Armak Company's Ethoquad®.

Preferred quaternary ammonium fabric softeners comprise compounds having $R^1$ and $R^2$ as each alkyl containing from about 16 to about 18 carbon atoms; and $R^3$ and $R^4$ as each alkyl containing from 1 to about 2 carbon atoms; and include ditallowdimethylammonium chloride and ditallowdimethylammonium methylsulfate. Mixtures of quaternary ammonium fabric softeners can, of course, be utilized in in the instant compositions.

The quaternary ammonium fabric softener serves primarily to impart a desirable soft tactile impression to fabrics treated therewith. These compounds also reduce the tendency of fabrics to retain static charge. Furthermore, when the quaternary ammonium fabric softeners are used herein in combination with diamine static control agents (and especially the diamine acid salts), there is exceptionally efficient dispersal of the quaternary ammonium softener throughout the rinse bath. Such effective dispersal of quaternary ammonium softener can provide a beneficial reduction of fabric staining which is sometimes caused by excess deposition of the quaternary ammonium softener on certain fabrics.

C. Water

The third essential component of the instant composition is water. Water comprises from about 50 to 98% by weight of the compositions, preferably from about 85 to 98% by weight. Water is the medium in which the essential diamine and quaternary ammonium materials are dispersed and in which other optional composition ingredients are dissolved or dispersed. Since minerals or other impurities in the water can react with certain of the other essential or optional composition components, it is preferable to utilize deionized or soft water in the composition herein.

Optional Components

Optional components of the aqueous compositions herein include (1) particulate sorbitan ester material, (2) opacifiers and (3) other conventional rinse-added fabric conditioning composition adjuvants.

1. Particulate Sorbitan Ester Material

Sorbitan esters in particulate form can be optionally included in the liquid fabric conditioning compositions herein. Such particulate sorbitan ester material is water-insoluble in nature and comprises the mono-, di-, tri- and tetra-esters of sorbitan and mixtures thereof.

Insoluble sorbitan ester particulate material varying in average size between about 5 and 150 microns becomes entrapped in fabrics being treated with the instant compositions in the deep rinse. Such particulate matter is then carried over with the fabrics to the automatic dryer wherein the fabrics are heated to the dryer operating temperature (usually between 38° and 77° C). This heating of the fabrics causes the sorbitan ester material to become soft and fluid and to thereby "lubricate" fabrics during the drying cycle. This "lubrication" is believed to provide static control (1) by reducing the generation of static charge caused by fabrics tumbling in the dryer and (2) by dissipating the static charge that is developed on the fabrics during tumbling in the dryer. Moreover, the sorbitan esters also provide fabric softening which is independent of rinse conditions such as surfactant carryover, temperature, water hardness, etc.

The concept of utilizing particulate sorbitan ester material for fabric conditioning during the home laundering operation is described in more detail in the co-pending U.S. patent application Ser. No. 520,186 of Haug et al., filed Nov. 1, 1974. This application discloses the use of sorbitan esters in various types of fabric treatment compositions, and the disclosure of this application is hereby incorporated by reference.

The particulate sorbitan ester material optionally employed in the present invention comprises the esterified dehydration products of sorbitol. Sorbitol itself prepared by the catalytic hydrogenation of glucose, can be dehydrated in well-known fashion to form mixtures of 1,4- and 1,5-sorbitol anhydrides (and small amounts of isosorbides) according to the following reaction: (See Brown, U.S. Pat. No. 2,322,821, issued June 29, 1943)

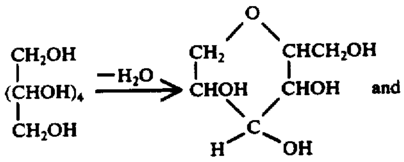

and

Sorbitol 1,5-Sorbitan

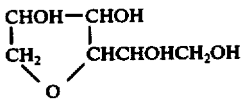

and

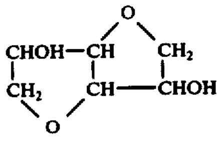

1,4-Sorbitan Isosorbide

The foregoing complex mixtures of anhydrides of sorbitol are collectively referred to herein as "sorbitan". It will be recognized that this sorbitan mixture will also contain some free, acyclic sorbitol.

Sorbitan esters of the type employed herein can be prepared by esterifying the sorbitan mixture with a fatty acyl group in standard fashion, e.g., by reaction with a fatty acid halide or fatty acid. The esterification reaction can occur at any of the available hydroxyl groups, and various mono-, di-, etc., esters can be prepared. In fact, mixtures of mono-, di-, tri-, etc., esters almost always result from such reactions, and the stoichiometric ratios of the reactants can simply be adjusted to favor the desired reaction product.

For commercial producton of sorbitan ester materials, etherification and esterification are generally accomplished in the same processing step by reacting sorbitol directly with fatty acids. Such a method of sorbitan ester preparation is described more fully in MacDonald, "Emulsifiers: Processing and Quality Control", Journal of the *Americal Oil Chemists' Society,* Volume 45, October, 1968.

The sorbitan mono-esters and di-esters are preferred for optional use in the softening compositions of the present invention.

The mixtures of hydroxy-substituted sorbitan esters useful herein contain, inter alia, compounds of the following formulae, as well as the corresponding hydroxy-substituted di-esters.

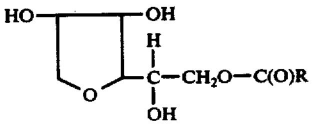

and

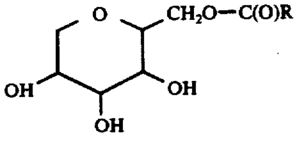

and

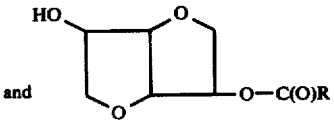

wherein the group RC(O)— is a $C_{10}$–$C_{26}$, and higher, fatty alkyl residue. Preferably this fatty alkyl residue contains from 16 to 22 carbon atoms. The fatty alkyl residue can, of course, contain non-interfering substituents such as hydroxyl groups. Esterified hydroxyl groups can, of course, be either in terminal or internal positions within the sorbitan molecule.

The foregoing complex mixtures of esterified dehydration products of sorbitol (and small amounts of esterified sorbitol) are collectively referred to herein as "sorbitan esters". Sorbitan mono- and di-esters of lauric, myristic, palmitic, stearic and behenic (docosanoic) acids are particularly useful herein. Mixed sorbitan esters, e.g., mixtures of the foregoing esters, and mixtures prepared by esterifying sorbitan with fatty acid mixtures such as the mixed tallow and hydrogenated palm oil fatty acids, are useful herein and are economically attractive. Unsaturated $C_{10}$–$C_{22}$ sorbitan esters, e.g., sorbitan mono-oleate, usually are present in such mixtures in low concentration. The term "alkyl" as employed herein to describe the sorbitan esters encompasses both the saturated and unsaturated hydrocarbyl ester side chain groups.

It will be recognized that the water-insoluble derivatives of the sorbitan esters herein, especially the "lower" ethoxylates thereof (i.e., mono-, di- and tri-esters wherein one or more of the unesterified -OH groups contain one to about six oxyethylene moieties [Tweens®]) are also useful in the compositions and methods of the present invention. Therefore, for purposes of the instant invention, the term sorbitan ester includes such derivatives.

Preparation of the sorbitan esters herein can be achieved by dehydrating sorbitol to form a mixture of anhydrides of the type set forth above, and subsequently esterifying the mixture, for example, using a 1:1 stoichiometry for the esterification reaction. The esterified mixture can then be separated into the various ester components. Separation of the individual ester products is, however, difficult and expensive. Accordingly, it is easier and more economical not to separate the various esters, using instead, the total esterified mixture as the sorbitan ester component. Such mixtures of esterified reaction products are commercially available under various tradenames, e.g., Span®. Such sorbitan ester mixtures can also be prepared by utilizing conventional interesterification procedures.

The preferred alkyl sorbitan esters for use in the softening compositions herein include sorbitan monolaurate, sorbitan monomyristate, sorbitan monopalminate, sorbitan monostearate, sorbitan monobehenate, sorbitan dilaurate, sorbitan dimyristate, sorbitan dipalmitate, sorbitan distearate, sorbitan dibehenate and mixtures thereof, and mixed coconut-alkyl sorbitan mono- and di-esters and mixed tallowalkyl sorbitan mono- and di-esters. Such mixtures are readily prepared by reacting the following hydroxy-substituted sorbitans, particularly the 1,4- and 1,5-sorbitans, with the corresponding acid or acid chloride in a simple esterification reaction. It is to be recognized, of course, that commercial materials prepared in this manner will comprise mixtures containing minor proportions of various tri-esters, tetra-esters, uncyclized sorbitol, fatty acids, polymers, isosorbide structures and the like. The presence or absence of such materials as minor components of the sorbitan ester mixtures is of no consequence to this invention. For most purposes, the commercially available sorbitan ester materials which comprise from about 20 to 60% by weight of the mono-ester component and from about 5 to 50% by weight of the di-ester component and which have melting points of at least about 38° C can be advantageously employed. Highly preferred materials include sorbitan monostearate, sorbitan monopalmitate, and 1:10 to 10:1 (wt.) mixtures thereof. Both the 1,4- and 1,5-sorbitan stearates and palmitates are useful herein.

It is to be recognized that the sorbitan esters from commercial sources, as well as those made in the manner disclosed herein, can contain up to about 15% by weight of esters of acids having a chain length of up to $C_{26}$, and greater, as well as some lower ($C_8$) acids. These materials can modify the melting points of the ester mixtures, but sorbitan ester mixtures melting at about 38° C and above, preferably at about 38° to about 68° C, are preferred for use herein.

The particulate sorbitan ester material, if present, is generally employed in the fabric conditioning compositions herein in levels of from about 0.1 to about 20% by weight, preferably from about 0.5 to about 5%.

2. Opacifiers

Opacifiers can be optionally included in the fabric conditioning compositions herein and are especially useful for imparting a thick, creamy appearance to such compositions. Moreover, when the fabric conditioning compositions as formulated are clear compositions, the addition of an opacifier is preferred for aesthetic appeal.

Opacifiers, if present, generally comprise from about 0.05 to about 1.0% by weight, but any amount sufficient to provide the desired opaque composition can be used.

Opacifiers are known in the art and can be selected from insoluble organic polymers such as polystyrene and polystyrene-maleic anhydride copolymers. Such materials are commercially available, as, for example, from Monsanto Corp. under the tradename of Lytron®.

Other opacifiers include insoluble organic compounds such as ethylene glycol distearates and the sorbitan ester material as described above.

Inorganic or organic particulate materials and mixtures thereof can also be employed as opacifiers. Such materials include, for example, titanium dioxide, various clays and starch. The density of such particulate material should, of course, be selected to provide optimum opacifying performance.

3. Other Conventional Fabric Conditioning Composition Adjuvants

Adjuvants can be added to the compositions herein at usual levels for their known purposes. Such adjuvants include solvents, emulsifiers, perfumes, preservatives, germicides, viscosity modifiers, colorants, dyes, fungicides, stabilizers and brightener compounds. These adjuvants, if desired, are added at their conventional low levels (e.g., from about 0.5 to 5% by weight).

The instant compositions should not, of course, contain any material which chemically interferes with the functioning of the essential composition components. Accordingly, such materials as anionic surfactants should not be present in the instant aqueous liquid fabric conditioning compositions.

Composition Preparation

The aqueous liquid fabric conditioning compositions herein can be prepared by adding the diamine static control agent(s) and quaternary ammonium fabric softener(s) to water using conventional techniques. For example, the diamine static control agent and quaternary ammonium softener can be heated to form a liquid oily phase and can then be added with high shear mixing to water maintained at elevated temperaures (e.g. 45° C). Preferably, the composition is then acidified to a pH of from about 5-7 to form a highly stable product. However, stabilizers (preferably conventional nonionic emulsifiers) can be added without acification to provide long term stability for such compositions.

Alternatively, the diamine static control agent/quaternary ammonium softener oily phase can be added to water which is maintained at elevated temperatures (e.g. 45° C) and which has been acidified with a water-soluble acid. This method can be utilized to prepare nearly clear aqueous fabric conditioning compositions containing diamine acid salts and quaternary ammonium softeners. This preparation method provides highly stable compositions which can withstand numerous freeze-thaw cycles without appreciable gelling.

In a further alternative preparation procedure, the diamine static control agent is in the form of the diamine acid salt and is co-melted with the quaternary ammonium softeners. The diamine acid salt/quaternary ammonium softener oily phase so formed is then added to water at elevated temperatures with high shear mixing. This co-melting procedure can also provide nearly clear aqueous liquid fabric conditioning compositions.

Additional and optional ingredients can be added to either the water phase or oily phase according to methods known in the art. The particulate sorbitan ester material, for instance, can simply be added to the oily phase which can thereafter be added to the heated water phase with high shear mixing.

The pH of the aqueous liquid fabric conditioning compositions herein generally ranges from about 3 to about 9, preferably from about 5 to about 7.

Preferably the weight ratio of diamine static control agent to quaternary ammonium fabric softener within the compositions prepared ranges from about 1:1 to 4:1, based on the weight of the diamine compound in unacidified form.

Composition Usage

The fabric conditioning compositions herein are added to the rinse cycle of conventional automatic laundry operations. Generally, rinse water has a temperature of from about 15° to about 60° C.

When compositions of the present invention are added to the deep rinse, the diamine static control agent is generally present at levels of 2 to about 500 ppm, preferably from about 10 to about 100 ppm. These concentration levels achieve effective fabric softening and static control.

When the present compositions are used as rinse-additives, the quaternary ammonium softener is generally present in the rinse at levels from about 2 to about 200 ppm, preferably from about 10 to about 100 ppm.

The particulate sorbitan ester material, if present in the rinse bath, is present in concentrations ranging from about 1 to about 200 ppm, preferably from about 3 to about 30 ppm.

In general, the invention herein in its fabric conditioning method aspect comprises (a) washing fabrics in a conventional automatic washing machine with a detergent composition (normally containing a detersive surfactant or mixture of surfactants selected from the group consisting of anionic, nonionic, amphoteric or ampolytic surfactants), (b) rinsing the fabrics, and (c) adding during the rinse stage of the operation the above-described levels of diamine static control agents, quaternary ammonium fabric softeners and, optionally, particulate sorbitan ester materials. Preferably, a final step (d) includes drying the fabrics in an automatic dryer at a temperature of at least about 38° C. This drying stage facilitates spreading of the fabric conditioning materials herein across the fabric surfaces and is especially useful when the particulate sorbitan ester material is utilized.

The following exemplifies the aqueous liquid fabric conditioning compositions and methods of this invention and the benefits achieved by the utilization of such compositions and methods. These examples are illustrative of the invention herein and are not necessarily considered as limiting thereof.

EXAMPLE I

Two thousand grams of the following liquid fabric conditioning composition are prepared:

| COMPONENT | WT. PER CENT |
|---|---|
| Diamine Static Control Agent-(N-tallow N,N',N' trimethyl 1,3 propane diammonium diacetate) | 5.0% |
| Quaternary Ammonium Softener-(Ditallowdimethylammonium chloride) | 1.0% |
| Isopropanol | 0.3% |
| Water | Balance |
| | 100.0% |

Composition pH = 6

This composition is prepared as follows: Eighty grams of N-tallow N,N',N' trimethyl 1,3 propane diamine (Duomeen® TTM marketed by Armak Co.) are heated at 80° C with 27 grams of Adogen® 442 (a product marketed by Ashland Chemical which comprises 20 grams ditallowdimethylammonium chloride and 7 grams isopropanol and water) to form a liquid oily phase.

This oily phase is added to a solution of 20.8 grams acetic acid in 1873 grams of water at a temperature of 43° C. The addition is carried out over two minutes by passing the heated oily phase through a drop tube into the water phase. The end of the drop tube is positioned about one centimeter from a mixing impeller which is rotated at 1500 rpm. After this addition, the aqueous composition is cooled slowly to room temperature to form a clear composition.

An aliquot of 36 grams of this clear aqeuous composition is tested as a rinse-added fabric conditioning compositon. The aliquot is added to the deep rinse of an automatic washing machine containing 17 gallons of water and 5½lbs. of fabrics. The fabrics are removed after the rinse is complete and are placed in an automatic dryer for 30 minutes.

The fabrics so treated are found to be soft and exhibit little or no static cling upon removal from the dryer.

Substantially similar compositions and preformance results are obtained when in the above-described Example I composition the acetic acid is replaced with an equivalent molar amount of hydrochloric acid; formic acid; or citric acid.

Substantially similar compositions and performance results are obtained when, in the Example I composition, the Duomeen TTM is replaced with an equivalent amount of N-tallow-N,N',N'triethyl-1,3-propane-diamine; N-hexadecyl-N,N',N'-trimethyl-1,3-propane-diamine; N-tetradecyl-1,3-propane-diamine; or N-eicosyl-N,N',N'-trimethyl-1,3-propane-diamine.

Substantially similar compositions and performance results are obtained when, in the Example I composition, the ditallowdimethylammonium chloride is replaced with an equivalent amount of ditallowdimethylammonium methylsulfate; dioctadecyldiethylammonium sulfate; ditetradecyldiethylammonium hydrogen phosphate; or dieicosyldimethylammonium acetate.

For aesthetic appeal 8 grams of Lytron 621 marketed by Monsanto Corp. are added after cooling the composition of Example I. Such a composition appears as a creamy, white product and is found to provide fabric softening and static control benefits substantially similar to the benefits of the clear composition of Example I.

EXAMPLE II

A liquid fabric conditioning composition is prepared having the following formulation:

| COMPONENT | WT. PER CENT |
|---|---|
| Diamine Static Control Agent (N-tallow-1,3 propane diamine)* | 4.0% |
| Quaternary Ammonium Softener (ditallowdimethylammonium chloride)** | 1.0% |
| Water and miscellaneous minor ingredients including preservative, coloring agent and perfume | Balance |
| | 100.0% |

*Duomeen® T - marketed by the Armak Co.
**Adogen® 442 - marketed by Ashland Chemical Composition pH = 8

Two thousand grams of this composition are prepared in accordance with the procedure described in Example I except that the water utilized contains no acetic acid.

The Example II composition is tested for its ability to provide fabric softening and fabric static control by adding 36 grams of the composition to the deep rinse of an automatic laundry operation. Excellent fabric softening and static control are obtained.

In this Example II composition, the Duomeen® T is replaced with an equivalent amount of Duomac® T, a commercially available diamine salt marketed by the Armak Co. This diamine salt is the diacetate salt of Duomeen T. Such a composition is stable and provides substantially equivalent fabric softening and fabric static control when added to the rinse cycle of an automatic laundry operation.

In this Example II compositions, 20 grams of a 1:1 mixture Tergitol® 15-S-3 and 15-S-9, commercially available nonionic surfactants, are added to provide long term stability to the composition. The Tergitol 15-S-3 and 15-S-9 are marketed by Union Carbide Corp. and are mixtures of $C_{11}$ to $C_{15}$ ethoxylated secondary alcohols.

EXAMPLE III

Two thousand grams of the following fabric conditioning composition are prepared.

| COMPONENT | WT. PER CENT |
|---|---|
| Diamine Static Control Agent (N-Octadecyl-N,N',N'-trimethyl-1,3-propane-diammonium diacetate) | 5.0% |
| Quaternary Ammonium Fabric Softener (dioctadecyldiethylammonium chloride) | 2.0% |
| Particulate Sorbitan Ester Material (*Glycomul®S) (Average particle size = 60 to 130 microns) | 1.0% |
| Water and Miscellaneous Ingredients | Balance |
| | 100.0% |

*Glycomul®S is marketed by Glyco Chemicals and is a mixture of the esters of 1,4 sorbitan. It has the following composition:
31% Tallowalkyl monoester of 1,4-sorbitan
35% Tallowalkyl diester of 1,4-sorbitan
12% Tallowalkyl tri- and tetra-esters of 1,4-sorbitan
15% Isosorbide Composition pH = 5

The Example III composition is prepared in accordance with the procedure described in Example I except that the particulate Glycomul® S (10 grams) is added to the water phase after addition of the oily phase, and 2 grams of Methocel® 60HB4000 (a cellulose derivative marketed by Dow Chemical) are added to modify viscosity.

The cooled Example III composition is opaque. The Example III composition is tested and found to provide excellent fabric softening and superior static control to laundered fabrics.

Fabric Static Control Evaluation

The fabric conditioning compositions of the instant invention are tested according to the following procedure for their ability to provide static control.

Several 5½lbs. bundles of fabrics (80% synthetic fabrics and 20% cotton fabrics) are washed and rinsed using normal washing and rinsing conditions and temperatures. As a "control" run, no fabric conditioning composition is added during the deep rinse cycle. During "test" runs, varying levels of aqueous liquid fabric conditioning compositions are added to the deep rinse. After all runs, the fabrics are dried in an automatic dryer for about 45 minutes after the washing and rinsing stages.

In order to measure the degree of static control provided by the various conditioning compositions tested, the total static charge for each laundry bundle used is measured after completion of the washing, rinsing and drying stages. To measure total static charge, a "Faraday Cage" device is employed. The freshly laundered and dried fabrics are placed into the device and the total charge provided by each bundle is computed.

Table I summarizes the results of the static control evaluation testing. The test measures the ability of five fabric conditioning compositions (Compositions A-E) to reduce total laundry bundle static charge from the total charge obtained when no rinse-added composition is used. Results in each of the Table I composition columns express the static control achieved in terms of a percentage reduction of the charge measured for the control run (i.e. no conditioning composition in the rinse).

The formula used to arrive at these percent reduction values in Table I is:

$$100 \times \left(1 - \frac{\text{Total Static Charge of Conditioned Bundle}}{\text{Total Static Charge of the Unconditioned (Control) Bundle}}\right)$$

Higher percentage reduction values indicate better static control performance. Replicate runs are shown.

Compositions which are tested each contain from 5 to 8% by weight of conditioning active ingredients. Each composition has a pH within the range of from 5 to 6. Composition usage concentrations are expressed in terms of grams of total conditioning active per 17 gallons of rinse water. Composition A is a commercially available rinse-added fabric softening composition containing ditallowdimethylammonium chloride as the only fabric conditioning ingredient. Compositions B–E are compositions of the present invention containing both ditallowdimethylammonium chloride and fully acidified N-tallow-N,N',N'-trimethyl-1,3-propane diamine in various weight ratios of the quaternary ammonium compound to diamine in unacidified form.

TABLE I

| | | COMPOSITION TESTED | | | | |
|---|---|---|---|---|---|---|
| USAGE (Gms Total Active Per 17–19 Gal.) | CONTROL Composition (% Reduction of Control Static Charge) | A Quat/Diamine = 100:0 (% Reduction of Control Static Charge) | B *Quat/Diamine = 13:7 (% Reduction of Control Static Charge) | C *Quat/Diamine = 1:1 (% Reduction of Control Static Charge) | D *Quat/Diamine = 7:13 (% Reduction of Control Static Charge) | E *Quat/Diamine = 1:4 (% Reduction of Control Static Charge) |
| 1.5 gm | 0% | 22% | — | 52% | — | — |
| 1.8 gm | 0% | — | — | — | — | 77% |
| 2.1 gm | 0% | — | 79% | 68% | 93% | 85% |
| 2.4 gm | 0% | 72%–74% | 94%–95% | 92% | 88%–97% | 97% |
| 3.3 gm | 0% | 68% | — | 98%–98% 99%–98% | — | — |

*Ratio computed on the basis of unacidified diamine compound.

As can be seen from Table I, the liquid conditioning compositions herein provide fabric static control far superior to that obtained when no fabric conditioning composition is used in the rinse. Furthermore, the Table I data demonstrates that the compositions of the instant invention provide static control superior to that obtained with a prior art composition containing only a single fabric conditioning active.

Fabric Softening

Compositions A through E of Table I are evaluated for their ability to soften fabrics. Softening evaluation is carried out using panels of expert graders who examine various types of fabrics treated with Compositions A–E under various conventional usage conditions. In all instances, the compositions of the present invention provide fabric softening performance equal to or better than that of prior art Composition A for cotton and synthetic fabrics when comparisons are made at equal usage levels.

Composition Stability

Compositions A through E are tested for stability after undergoing a freeze-thaw cycle. Each composition tested has equal levels by weight of active fabric conditioning compound(s). Prior art Composition A is found to remain as a thick gell after being exposed overnight to a temperature of 0° C and subsequently thawed at room temperature for about 4 hours. On the other hand, Compositions B through E of the present invention do not show any gelling tendency after such a freeze-thaw cycle, although some separation is noted at lower weight levels of the diamine.

What is claimed is:

1. Liquid rinse-added fabric conditioning compositions comprising:

a. from about 0.5 to about 50% by weight of a static control agent selected from the group consisting of water-soluble acid salts of diamine compounds of the formula

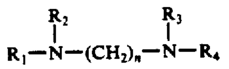

wherein $n$ ranges from 2 to 5; $R_1$ is an alkyl group containing from about 12 to 200 carbon atoms; and $R_2$, $R_3$ and $R_4$ are each hydrogen or alkyl groups containing 1 to 20 carbon atoms, provided that at least two of $R_2$, $R_3$ and $R_4$ are each hydrogen or alkyl containing from about 1 to about 3 carbon atoms, said salts having a solubility in water of at least 1 gram per liter at 25° C;

b. from about 0.5% to about 20.0% by weight of a quaternary ammonium fabric softener selected from the group consisting of compounds of the formula

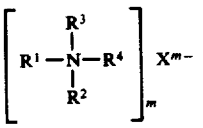

wherein $R^1$ is an alkyl group containing from about 12 to 20 carbon atoms; $R^2$ is alkyl of about 1 to 20 carbon atoms, $R^3$ and $R^4$ are each alkyl of about 1 to 3 carbon atoms; X is a non-interfering anion; and $m$ is 1 when X is monovalent and $m$ is 2 when X is divalent; and c. from about 50 to 98% by weight of water; said composition having a pH value within the range of from about 3 to 9.

2. A composition according to claim 1 wherein the diamine salt static control agent comprises from about 1 to about 10% by weight of the composition; the quaternary ammonium fabric softener comprises from about 0.5 to about 8% by weight of the composition; and water comprises from about 85 to about 98% by weight of the composition.

3. A composition according to claim 1

A. wherein the diamine salt static control agent consists essentially of fully and partially acidified diamine acid salts derived from an acid selected from the group consisting of hydrochloric acid, acetic acid, sulfuric acid, sulfonic acid, formic acid and citric acid; and B. wherein the composition pH is maintained between about 5 and 7.

4. A composition according to claim 3 wherein for the diamine static control agent $R_1$ is alkyl from about 16 to about 18 carbon atoms; $R_2$ is hydrogen or alkyl from about 1 to about 2 carbon atoms; $R_3$ is hydrogen or alkyl from about 1 to about 2 carbon atoms; $R_4$ is hydrogen or alkyl from about 1 to about 2 carbon atoms; and *n* is 3.

5. A composition according to claim 4 wherein for the quaternary ammonium fabric softener $R^1$ is alkyl of from about 16 to about 18 carbon atoms; $R^2$ is alkyl from about 16 to about 18 carbon atoms; $R^3$ is alkyl of from about 1 to about 2 carbon atoms; and $R^4$ is alkyl of from about 1 to about 2 carbon atoms.

6. A composition according to claim 5 wherein the weight ratio of the diamine salt static control agent to quaternary ammonium fabric softener compound varies from about 1:1 to about 4:1, based on the weight of the diamine compound in unacidified form.

7. A composition according to claim 6 which additionally contains an opacifier in an amount sufficient to impart an opaque appearance to the composition.

8. A composition according to claim 1 which contains from about 0.1 to about 20% by weight of the composition of water-insoluble particulate sorbitan ester material selected from the group consisting of mono-, di-, tri-, and tetra-esters of sorbitan and mixtures thereof, said ester material having an average particle size between about 5 and 150 microns.

9. A composition according to claim 8 wherein the particulate sorbitan ester material is selected from mono- and di-esters of sorbitan and mixtures thereof.

10. A composition according to claim 9 wherein the sorbitan ester is selected from the group consisting of sorbitan monolaurate, sorbitan monomyristate, sorbitan monopalmitate, sorbitan monostearate, sorbitan monobehenate, sorbitan dilaurate, sorbitan dimyristate, sorbitan dipalmitate, sorbitan distearate, sorbitan dibehenate, and mixtures thereof.

11. The composition of claim 2 wherein the diamine salt static control agent has a water solubility of at least 5 grams per liter at 25° C.

* * * * *